UNITED STATES PATENT OFFICE.

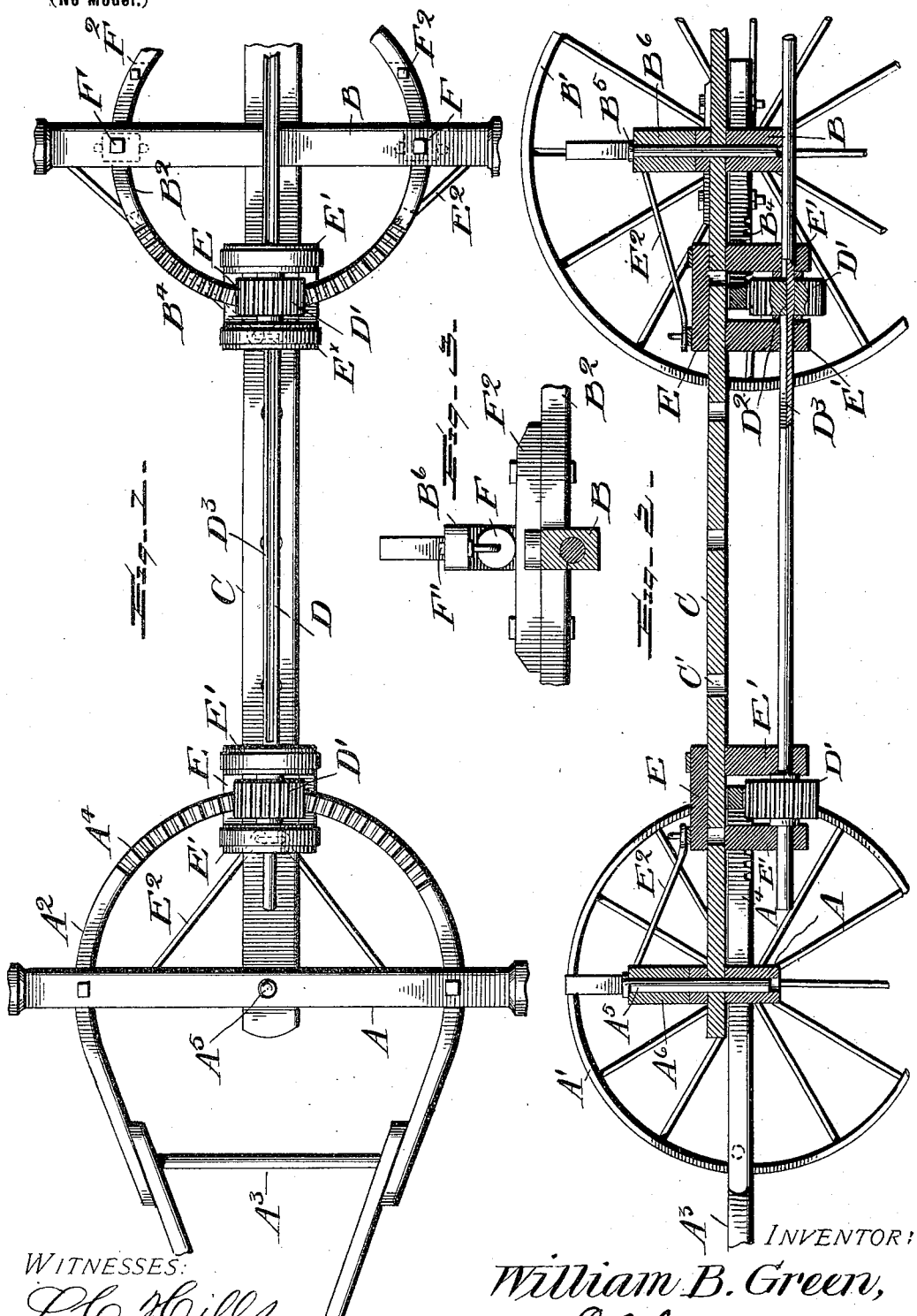

WILLIAM B. GREEN, OF RAGSDALE, KENTUCKY.

SHORT-TURNING GEAR FOR VEHICLES.

SPECIFICATION forming part of Letters Patent No. 659,743, dated October 16, 1900.

Application filed June 19, 1900. Serial No. 20,842. (No model.)

*To all whom it may concern:*

Be it known that I, WILLIAM B. GREEN, a citizen of the United States, residing at Ragsdale, in the county of Graves, State of Kentucky, have invented certain new and useful Improvements in Short-Turning Gear, of which the following is a specification, reference being had therein to the accompanying drawings.

This invention relates to short-turning gears, and particularly to a construction adapted to vehicles in which the rear axle and parts carried thereby may be adjusted longitudinally of the reach.

The invention has for an object to provide an adjustable connection between the front and rear hounds of a running-gear, whereby the rear wheels of the vehicle will track with those of the front and permit a short turn to be made without wrenching or other injury to the parts of the vehicle.

A further object of the invention is to provide a structure which may be readily adjusted in position without the necessity of more manipulation than simply removing the adjusting-bolt and placing the rear axle at the desired position upon the reach.

A further object is to provide means for supporting and guiding the rear bolster of the vehicle in any of the positions which it may assume when turning.

Other objects and advantages of the invention will hereinafter appear in the following description, and the novel features thereof will be particularly pointed out in the appended claims.

In the drawings, Figure 1 is a plan of the body of a vehicle running-gear. Fig. 2 is a longitudinal section of the same, and Fig. 3 is a side elevation of the rear bolster.

Like letters of reference indicate like parts throughout the several figures of the drawings.

The letter A indicates the front axle of a vehicle, adapted to receive at its opposite ends the wheels A' and to support the hound $A^2$, which may be of any desired construction and, if desired, carry at its forward end a connection $A^3$ for the pole of the vehicle. The hound $A^2$ has secured upon its under face or formed integral therewith a segmental rack-gear $A^4$, all of which parts may be of any usual or ordinary construction. Extending from the front axle A to the rear axle B is a reach-bar C, provided with suitable adjusting apertures C', secured to the front axle by means of a king-bolt $A^5$, passing through the bolster $A^6$ of the front axle and through an aperture in the reach. The rear axle B is provided at its opposite ends with wheels B' and has secured thereto a hound $B^2$, which is provided with gear-teeth $B^4$, similar in construction to those upon the front hound. The rear axle is secured to the reach by means of a king-bolt $B^5$, similar to the bolt $A^5$ and passed through the rear bolster $B^6$. The several features hereinbefore described may be of any preferred construction. For the purpose of transmitting motion from the segmental gear $A^4$, carried by the front axle, to the gear $B^4$, carried by the rear axle, I have provided a driving-shaft D, which has secured thereon pinions D', each of which is held against rotation by means of a key $D^2$, adapted to slide within a groove $D^3$, formed in the shaft D. It will be obvious that any other suitable means, however, may be used for preventing rotation of the pinions upon the shaft and permitting the longitudinal movement of the pinions thereon when desired. The ends of this shaft D are supported by suitable sliding collars E, located upon the reach C and having depending hangers E', in which the shaft D may rest and by which the movable pinion D' may be guided and held in constant relation to its pinion. The collars E are supported from the front and rear bolsters by any desired means—for instance, brace-rods $E^2$—so that when the bolster is moved upon the reach the collar will move therewith and the hangers will also be adjusted lengthwise of the driving-shaft D. Both of the collars and hangers may be adjusted upon the reach or one—for instance, the front one—secured in position and merely the rear bolster adjusted.

For the purpose of providing a firm and practically frictionless bearing for the rear bolster $B^6$, I have provided upon the under face thereof a friction-roller F, which may be secured in position by any desired means—for instance, a bearing-bracket F'—and is adapted to travel upon a track or way $F^2$ of any suitable construction secured upon the upper face of the hound B² at the opposite end portions thereof. This structure permits the movement of the rear hound without material or excessive friction upon the bolster and facilitates the turning of the vehicle. A similar structure may, if desired, be applied to the front bolster.

The operation of the invention will be apparent from the foregoing description, and it will also be seen that the structure herewith presented forms a simple and durable short-turning gear, in which the distance between the front and rear axles can be varied, as desired, and the wheels caused to accurately track, which is particularly desirable in narrow roads or those in which there are obstacles upon the sides of the roads, such as are encountered in lumbering districts or in mountaineous localities.

It will be obvious that changes may be made in the details of construction and configuration of the several parts without departing from the spirit of my invention as defined by the appended claims.

Having described the invention, what I claim as new, and desire to secure by Letters Patent, is—

1. In a running-gear for vehicles, the combination with front and rear axles and bolsters pivoted thereon, of a reach connecting the axles, segmental gears carried by and movable with said axles, a driving-shaft supported from said reach, and a pinion supported upon said shaft and connected with one of said bolsters to mesh with one of said movable gears and move therewith in the adjustment of the axle upon the reach; substantially as specified.

2. In a running-gear for vehicles, the combination with front and rear axles and bolsters pivoted thereon, of a reach connecting the axles, segmental racks carried by and movable with said axles, a driving-shaft supported from said reach, and pinions supported upon said shaft and connected with said bolsters to mesh with said racks, one of which pinions is adapted to be adjusted longitudinally of the driving-shaft and reach; substantially as specified.

3. In a running-gear for vehicles, the combination with front and rear axles provided with segmental racks, of a reach adjustably connected with one of said axles, bolsters pivoted upon each of said axles, collars supported from each of said bolsters and slidingly mounted upon said reach, a driving-shaft supported from said collars, and pinions upon said shaft held in constant relation to mesh with said racks by said collars; substantially as specified.

4. In a running-gear for vehicles, the combination with front and rear axles provided with segmental racks, of a reach adjustably connected with one of said axles, bolsters pivoted upon each of said axles, collars supported from each of said bolsters and slidingly mounted upon said reach, a driving-shaft supported from said collars, and pinions upon said shaft adapted to mesh with said racks, one of which is guided in its longitudinal movement upon the shaft by projections from one collar; substantially as specified.

5. In a running-gear for vehicles, the combination of front and rear axles provided with segmental racks, a reach adjustably connected with one of said axles, bolsters pivoted upon each of said axles, sliding collars secured to said bolsters and mounted upon said reach, depending hangers from said collars, a driving-shaft rotatably mounted in the lower portion of said hangers, and pinions located between the hangers of each collar and adapted to mesh with said racks and move therewith in the adjustment of the axle upon the reach; substantially as specified.

In testimony whereof I affix my signature in presence of two witnesses.

WILLIAM B. GREEN.

Witnesses:
 WALTER S. MASON,
 JERRY B. MASON.